United States Patent

Neylan et al.

[19]

[11] Patent Number: 5,948,291
[45] Date of Patent: Sep. 7, 1999

[54] LASER BEAM DISTRIBUTOR AND COMPUTER PROGRAM FOR CONTROLLING THE SAME

[75] Inventors: Edward J. Neylan, Nashua, N.H.; Harry Hong Gao, Stoneham; Donald T. Regan, Maynard, both of Mass.

[73] Assignee: General Scanning, Inc., Wilmington, Mass.

[21] Appl. No.: 08/841,289

[22] Filed: Apr. 29, 1997

[51] Int. Cl.$^6$ .................................................... B23K 26/00
[52] U.S. Cl. .............................. 219/121.77; 219/121.74; 359/629; 364/474.08
[58] Field of Search ........................ 219/121.74, 121.77, 219/121.6; 359/629, 633, 636; 364/474.08

[56] References Cited

U.S. PATENT DOCUMENTS

| | | |
|---|---|---|
| 4,487,477 | 12/1984 | Helms et al. . |
| 4,532,402 | 7/1985 | Overbeck . |
| 4,659,185 | 4/1987 | Aughton .................................. 359/629 |
| 4,685,775 | 8/1987 | Goodman et al. . |
| 4,701,591 | 10/1987 | Masaki et al. ...................... 219/121.77 |
| 4,797,696 | 1/1989 | Allen et al. .............................. 359/636 |
| 4,927,226 | 5/1990 | Oritz, Jr. ............................. 219/121.77 |
| 5,016,149 | 5/1991 | Tanaka et al. ........................... 362/259 |
| 5,029,955 | 7/1991 | Chu . |
| 5,067,805 | 11/1991 | Corle et al. . |
| 5,107,367 | 4/1992 | Desnoux et al. . |
| 5,113,055 | 5/1992 | Kuriyama ........................... 219/121.77 |
| 5,247,162 | 9/1993 | Swartz et al. . |
| 5,272,309 | 12/1993 | Gorughanthu et al. ............. 219/121.77 |
| 5,302,798 | 4/1994 | Inagawa et al. .................... 219/121.77 |
| 5,353,296 | 10/1994 | Koop .................................... 219/121.6 |
| 5,381,439 | 1/1995 | English, Jr. et al. . |
| 5,394,270 | 2/1995 | Sturm ...................................... 359/636 |
| 5,400,132 | 3/1995 | Trepagnier . |
| 5,504,630 | 4/1996 | Hansen .............................. 219/121.74 |
| 5,535,042 | 7/1996 | Takada . |
| 5,611,946 | 3/1997 | Leung et al. ......................... 219/121.6 |
| 5,798,867 | 8/1998 | Uchida et al. .......................... 359/629 |

FOREIGN PATENT DOCUMENTS

| | | |
|---|---|---|
| 0124144 | 11/1984 | European Pat. Off. . |
| 0131290 | 1/1985 | European Pat. Off. . |
| 0548831A2 | 6/1993 | European Pat. Off. . |
| 0552825A2 | 7/1993 | European Pat. Off. . |
| 2702850 | 9/1994 | France . |
| 61-17392 | 1/1986 | Japan ................................ 219/121.74 |
| WO 91/02277 | 2/1991 | WIPO . |

OTHER PUBLICATIONS

"Laser Mizromachine" by Klauser in IBM Technical Disclosure Bulletin, vol. 21, No. 11, pp. 4431–4432, Apr. 1979.
Abstract of Japanese Patent Publication No. JA 2–201311 (A); "Optical Branching Device"; published Aug. 9, 1990.

*Primary Examiner*—Geoffrey S. Evans
*Attorney, Agent, or Firm*—Fish & Richardson P.C.

[57] ABSTRACT

A laser beam distribution apparatus for preferably directing laser energy upon work pieces. The apparatus includes a laser beam, and a series of beam reflector members disposed along a beam path, at least one of which is movable and has at least one selectable transmissive portion and at least one selectable reflective portion. In addition, the apparatus includes a selectively controllable drive device constructed to position a selected portion of the movable reflector member in the laser beam path to distribute the beam to a selectable destination.

28 Claims, 10 Drawing Sheets

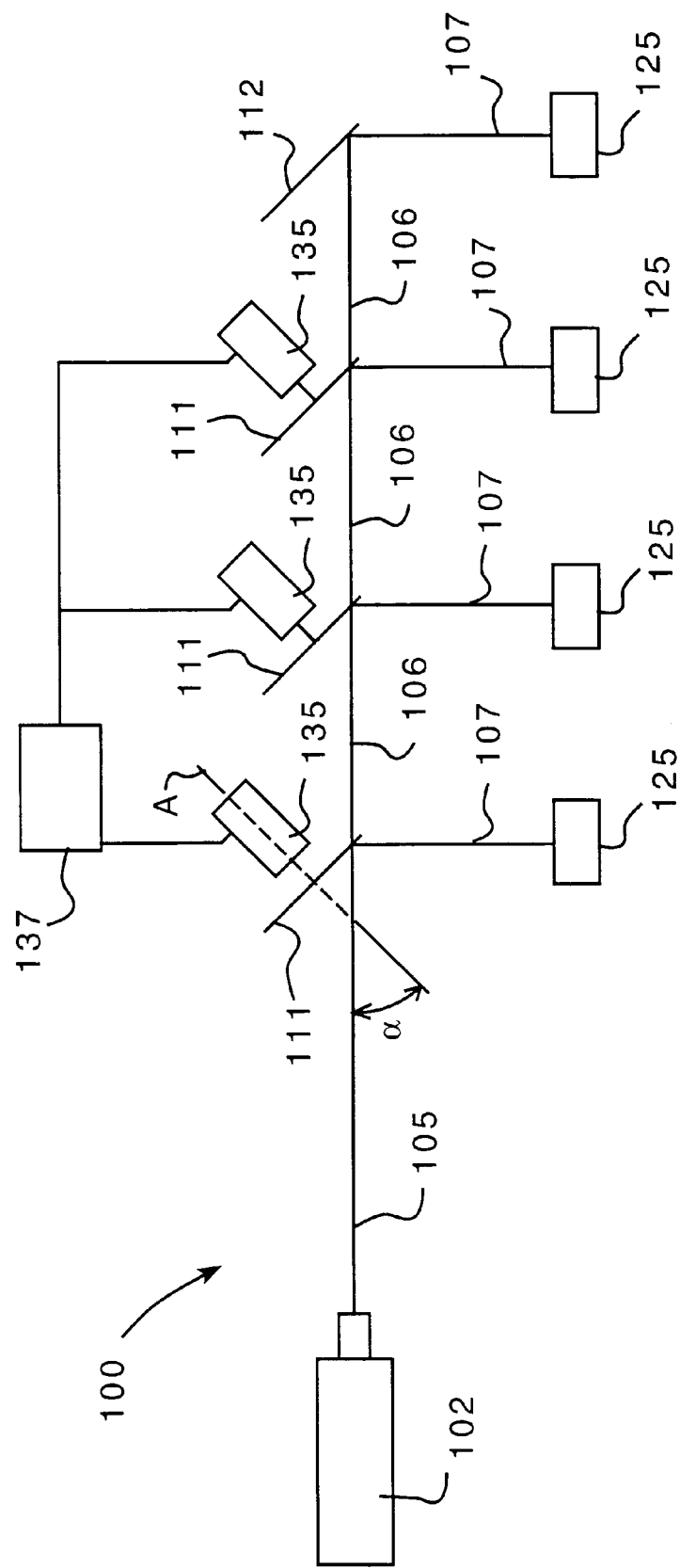

LASER BEAM DISTRIBUTOR AND COMPUTER PROGRAM FOR CONTROLLING THE SAME

FIELD OF THE INVENTION

This invention relates to distribution of laser beams for laser scribing and other treatment of work pieces.

BACKGROUND OF THE INVENTION

Laser beams are used widely throughout industry for a variety of applications. It is often desirable to increase utilization of a laser by applying its beam to a number of work stations.

Splitting a beam into multiple, lower powered beams, or switching the beam from one work station to another is known; however, complicated systems and methods have typically been used.

SUMMARY OF THE INVENTION

According to this invention, it is realized that advantages can be obtained by providing a laser distribution system that provides the selectable capability of splitting the beam, switching the beam, or the combination of both splitting and switching the beam, by employing a serial arrangement of devices under computer control. Such a system is especially convenient and cost effective when provided as a single hardware system that without any change in physical setup or other reconfiguration enables selection of the mode of use.

A laser beam distribution apparatus for directing laser energy upon work pieces is described. The apparatus comprises a stationary laser beam input, a series of beam reflector members disposed along a beam path, at least one of which is movable, and a selectively controllable drive device constructed to position a selected portion of the movable reflector member in the laser beam path to distribute the beam to a selectable destination.

BRIEF DESCRIPTION OF THE DRAWINGS

FIG. 1a is a diagram of a laser distribution apparatus having a series of rotatable reflector members and a stationary reflector member.

FIG. 3b is a time diagram showing the laser power distribution of FIG. 3a.

FIG. 4b is a time diagram showing the laser power distribution of FIG. 4a.

FIG. 5b is a time diagram showing the laser power distribution of FIG. 5a.

FIG. 6b is a time diagram showing the laser power distribution of FIG. 6a.

FIG. 7b is a time diagram showing the laser power distribution of FIG. 7a.

DESCRIPTION OF PREFERRED EMBODIMENTS

Figure 1B:
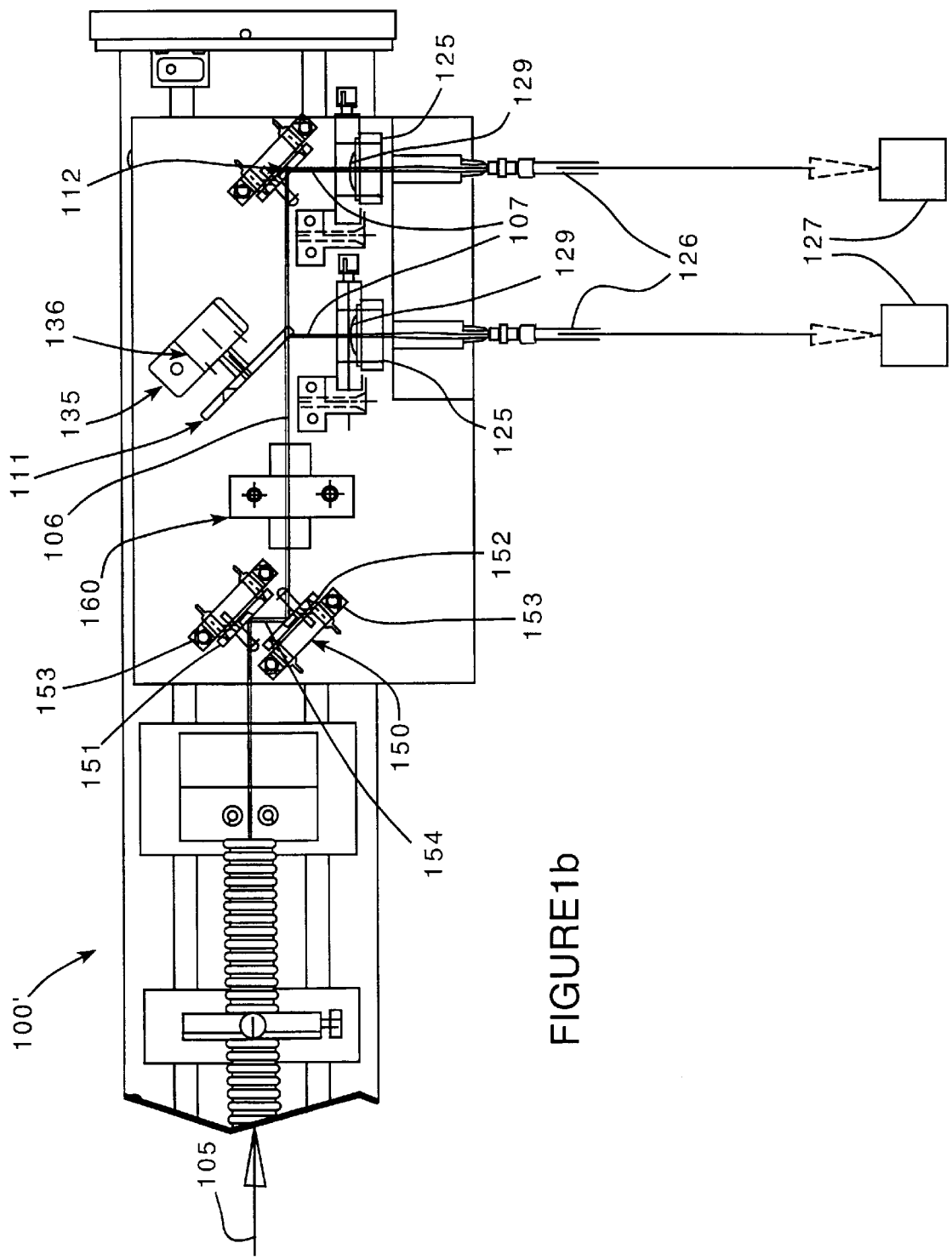
FIG. 1b is a plan view of a laser distribution apparatus having two reflector members, one rotatable and one stationary.

A laser beam distribution apparatus 100 is shown in FIG. 1a. A stationary laser 102 directs an input laser beam along path 105 into the laser beam distribution apparatus 100. The beam continues in a straight line through apparatus 100 along path 106. Multiple reflector members 111, 112 are mounted in series with a portion of each reflector member intersecting the laser beam path 105, 106. The intersection of the laser beam path 105, 106 with the reflector members 111, 112 results in a distribution of the output laser beams 107 toward multiple receptors 125, corresponding to the multiple reflector members 111, 112. In preferred embodiments receptor 125 is followed by a device for holding a work piece and adapted to perform laser scribing, laser cutting and the like.

At least one of the reflector members of the set is movable, and in a preferred embodiment, all of the reflector members are movable except the last one. In the embodiment shown in FIG. 1a, three members 111 are each rotatable about axis A that intersects the beam path at angle α and the last reflector member 112 is a fixed, reflective mirror. The rotatable reflector members 111 are individually driven by associated motor 135 under control of common control device 137.

In most preferred embodiments, a movable reflector member contains at least one reflective portion and one transmissive portion. In other embodiments filters, polarizers of other devices that influenced the character of the beam are incorporated. As shown in FIG. 2a, in a preferred embodiment, the movable reflector member 111 contains one fully reflective portion 115, one fully transmissive portion 116, and one partially transmissive portion 117. Selective movement of the portions 115, 116, 117 of the various movable reflector members 111 into the beam path 105, 106 determines the distribution of the output laser beams 107 in respect of time and intensity.

The fully reflective portion 115 is preferably a reflective mirror, and the fully transmissive portion 116 is preferably a through-hole or a notch. Alternatively, the fully transmissive portion 116 is a window or filter in which case, in some instances, correction is made for distortion to the beam path 106 caused by passage of the beam through it.

When the beam in path 105, 106 impinges on the fully reflective portion 115, the beam is totally diverted toward a receptor 125. When the beam path 105, 106 impinges on the fully transmissive portion 116, the beam is totally transmitted to the next reflector member 111, 112. When the beam impinges on a partially transmissive portion 117, the beam is partially diverted toward the corresponding receptor 125, and partially transmitted to the next reflector member. The amount of beam power transmitted is determined by the amount of transmissivity of the selected portion 117. With only one partially transmissive portion 117, a reflector member 111 is capable of partially transmitting at only one level.

Figure 2B:
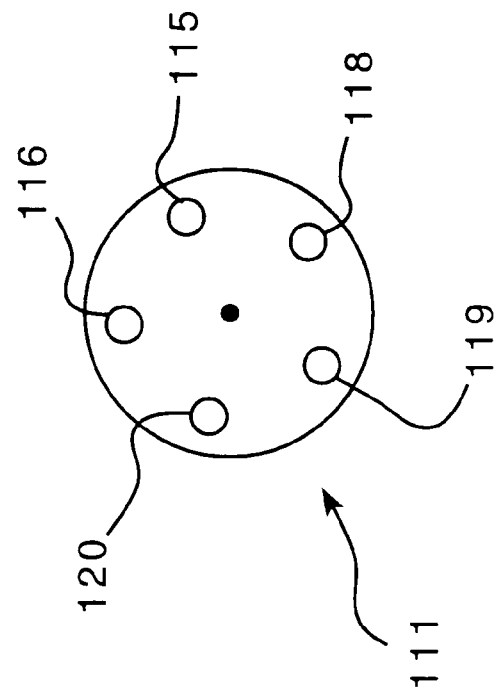
FIG. 2b is a detailed view of a rotatable reflector member having a fully reflective portion, a fully transmissive portion, and multiple partially transmissive portions that have different levels of transmissivity.
Figure 2A:
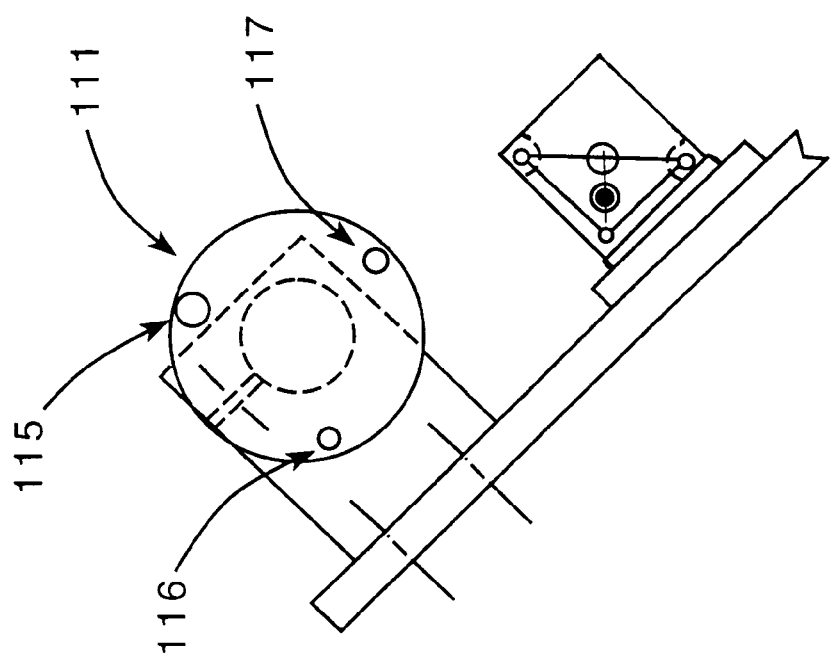
FIG. 2a is a detailed view of a rotatable reflector member having a fully reflective portion, a fully transmissive portion and a partially transmissive portion.

In FIG. 2b, a movable reflector member 111 is shown with a fully reflective portion 115, a fully transmissive portion 116, and multiple partially transmissive portions 118, 119 and 120 having respective transmissivity ratios of 3/4, 2/3 and 1/2. Multiple partially transmissive portions 118, 119, 120 enable transmission at various levels. The numerous available combinations and permutations of beam transmissivity increases the versatility and capabilities of the apparatus.

FIG. 1b is a plan view of a portion of laser distribution apparatus 100', which comprises two reflector members, a movable member 111, here again member 111 being rotatable, and a stationary member 112. The two reflector members are arranged in series such that the beam in path 105, 106 intersects a portion of each member 111, 112 as described above.

Distribution apparatus 100' includes beam steering mechanism 150 and a beam expander 160 in the input beam path 105, prior to the reflector members. The beam steering mechanism 150 comprises two adjustably mounted mirrors 151, 152. The beam in input path 105 directed onto the first mirror 151, is diverted to the second mirror 152, which then directs the beam toward the reflector members 111. By adjustment of the mirror mountings 153 beam steering mechanism 150 provides for precise adjustment of the beam path 106. The high accuracy of alignment with the reflector members 111 thus achieved enables proper functioning of the laser distribution apparatus 100' in applications requiring extreme accuracy in performance of the laser scribing, cutting functions or other functions performed at work station 127. Such beam adjustments often need be made only after major change or relocation of the laser 102.

After the second mirror 152, beam expander 160 is mounted to re-focus the beam to compensate for any divergence introduced by the beam steering mechanism 150, by performing a collimating function. This ensures that the beam is tightly focused prior to distribution.

The construction of receptors employed to receive the distributed laser beam depends upon the intended application of the apparatus. In an important embodiment, each receptor 125 of FIGS. 1a and 1b comprises focusing lens 129 which focuses the output beam 107 into a fiber optic cable 126. This fiber optic cable 126 then transmits the beam 107 to a material treatment device 127. In a preferred embodiment, the material treatment device 127 is a scanning head capable of marking a work piece with letters and/or graphics by interaction of a powerful laser beam with the substance of the work piece.

In another embodiment, receptor 125 is an attenuator which dissipates a desired amount of laser energy from the beam. This provides increased versatility of the laser distribution apparatus 100' by enabling the transmission of selected lower laser beam power to match the work piece or other work requirements without requiring change in the laser power or the function of the distribution apparatus.

Selective operation of motor 135 of FIGS. 1a and 1b moves each rotatable reflector member 111 to align the specific portion of the reflector member (115, 116, 117, FIG. 2a, 115, 116, 118, 119, 120, FIG. 2b) in the beam path 106 to produce the desired beam distribution. In a preferred embodiment, the motor comprises a stepper motor and drive 135 which is computer software controlled by control system 137. The stepper motor 135 selectively rotates the movable reflector member 111 into position in the beam path 106.

Software for control of the stepper motors 136 (see FIG. 9 described more fully below) is based on a determination of how many reflector members are connected to the system, whether the reflector members are movable 111 or stationary 112, how many and what type of receptors 125 are connected, and which receptor 125 corresponds to which reflector member. In addition, the control system is made aware, by suitable user inputs, of the power requirements for each receptor 125 and the time duration for the work to be performed via each receptor 125.

Given these parameters, the control software can then determine which portion, e.g. 115, 116, 117 of FIG. 2a, of the movable reflector member 111 is to be positioned in the beam path 106 in order to distribute the output beam 107 to the appropriate receptor 125 at the desired power for the given time duration. The control software sends calculated control pulse information to the stepper motor 136 so that it rotates the desired portion 115, 116, 117 into the correct position at the correct time. Extreme accuracy is obtained so that the beam in path 106 impinges precisely on the desired portion 115, 116, 117 resulting in an output beam path 107 of the correct power being transmitted to the correct receptor 125.

Figure 3A:
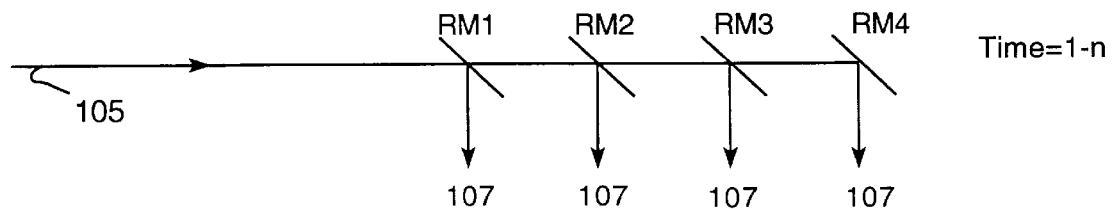
FIG. 3a is a diagram of the laser distribution apparatus of FIG. 1a with four reflector members selectively positioned to distribute a laser beam equally to four selected destinations.
Figure 3B:
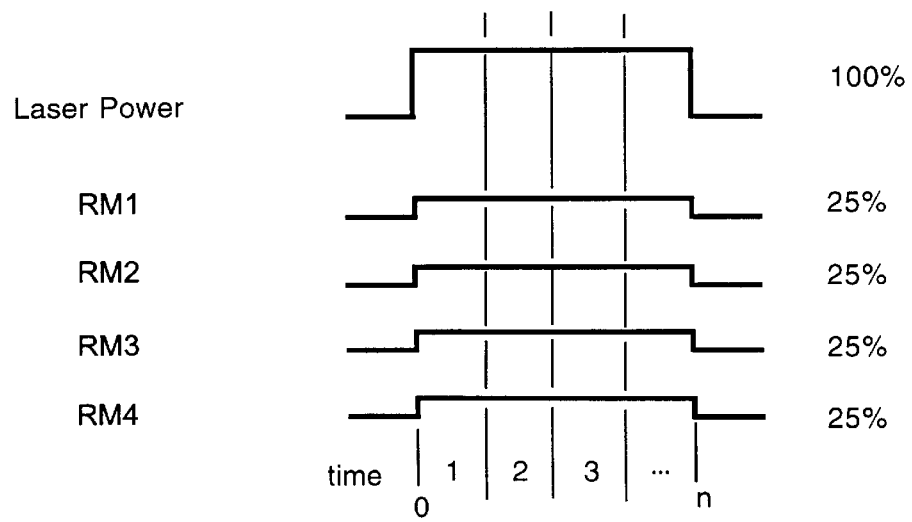
Figure 4A:
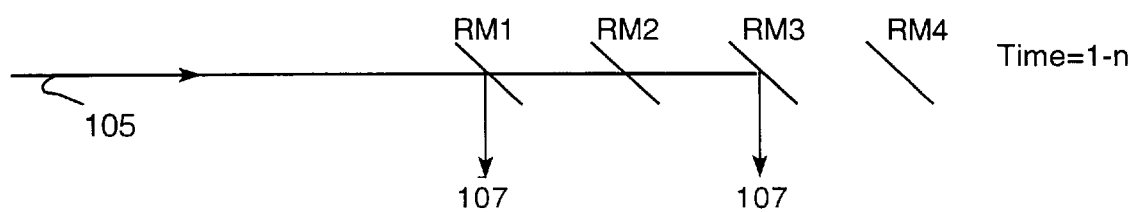
FIG. 4a is a diagram of the laser distribution apparatus of FIG. 1a with four reflector members selectively positioned to distribute a laser beam equally to two selected destinations.
Figure 4B:
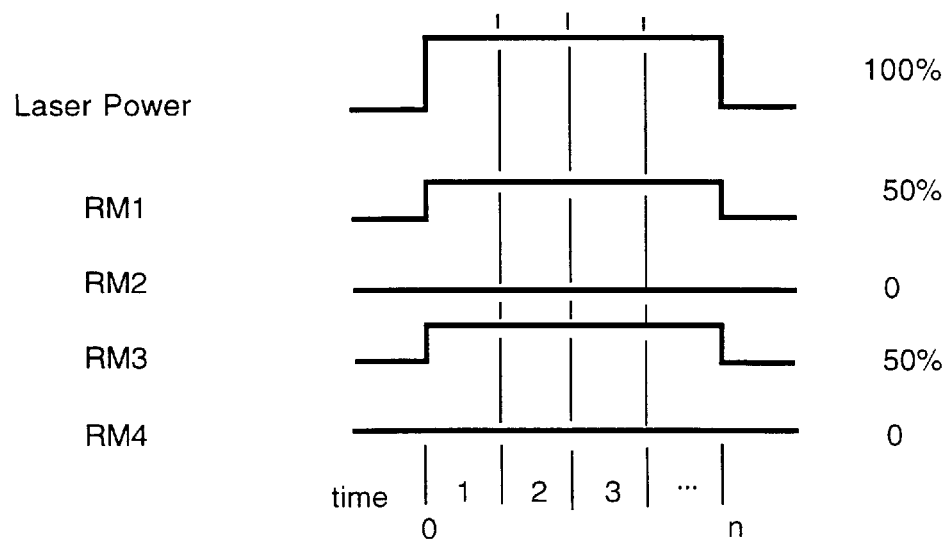
Figure 5A:
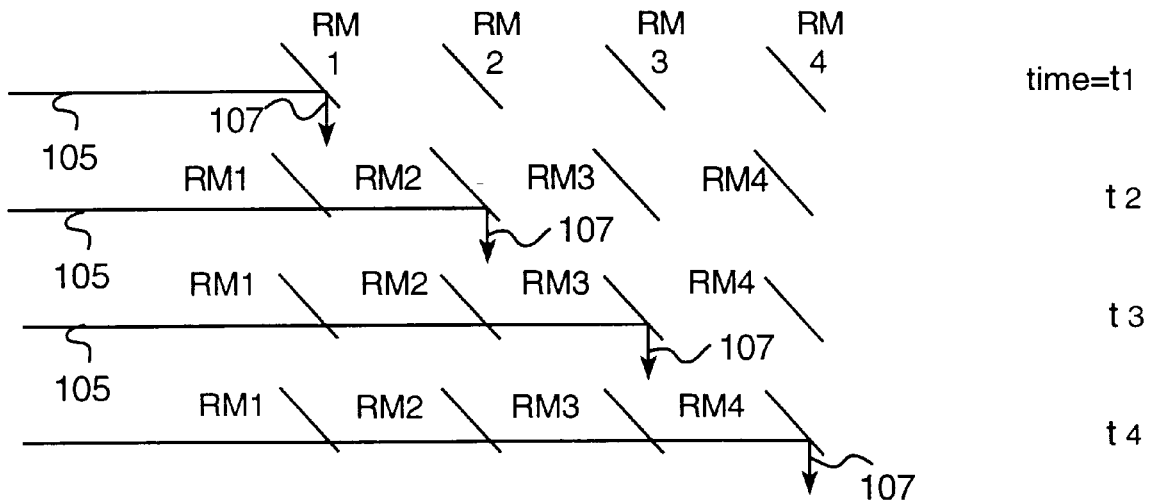
FIG. 5a is a diagram of the laser distribution apparatus of FIG. 1a with four reflector members sequentially selectively positioned over time to distribute a laser beam to four selected destinations.
Figure 5B:
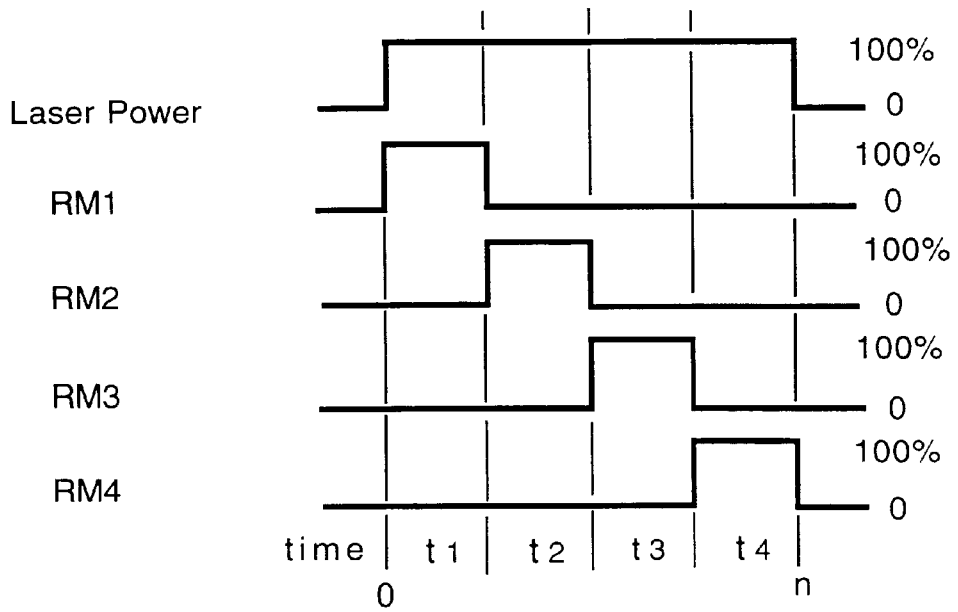
Figure 6A:
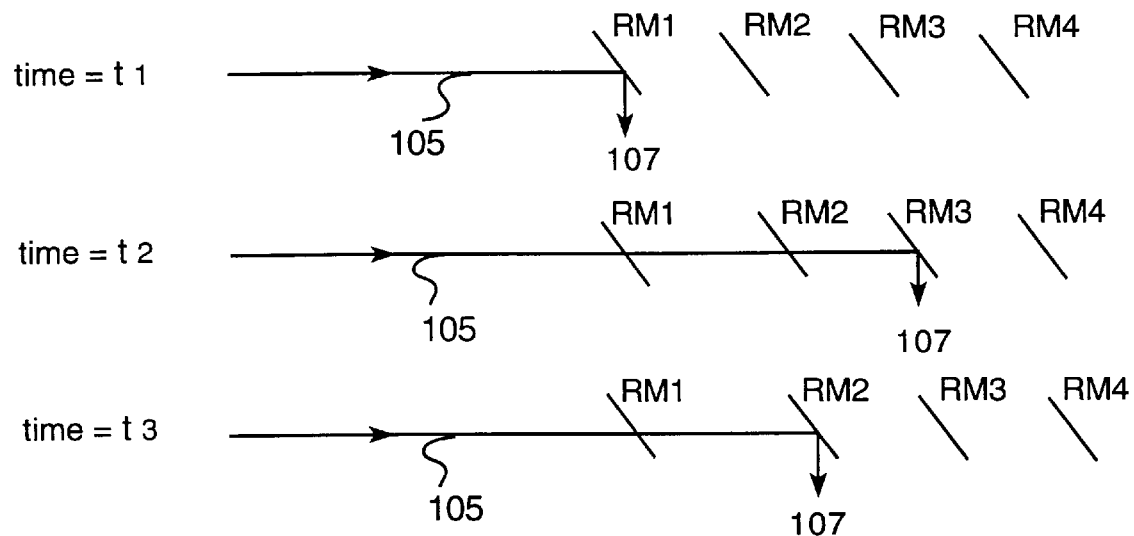
FIG. 6a is a diagram of the laser distribution apparatus of FIG. 1a controlled to cause the four reflector members each to distribute a laser beam fully to its respective destination in a selected discrete time interval.
Figure 6B:
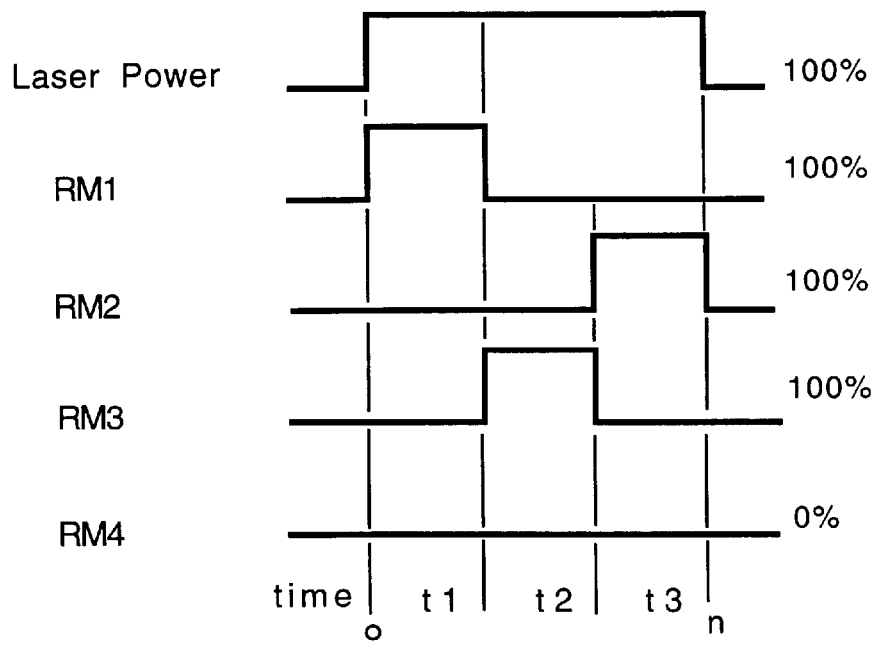
Figure 7A:
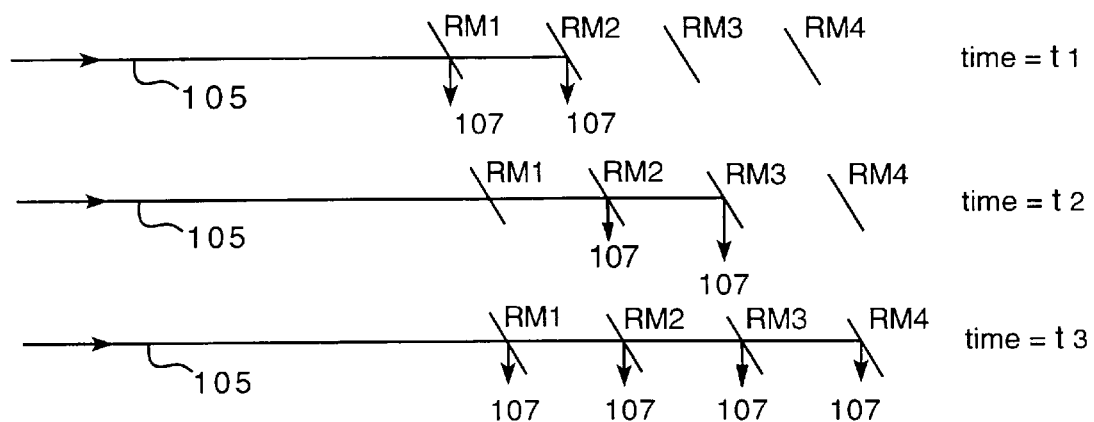
FIG. 7a is a diagram of the laser distribution apparatus of FIG. 1a with four reflector members selectively positioned to distribute a laser beam to multiple selected destinations in discrete time intervals.

With the hardware and software described, the output beam 107 distribution of the laser distribution apparatus 100 is readily selectable in numerous different configurations. FIGS. 3a–7a are schematic representations of the laser distribution device 100 depicted in FIG. 1a showing various alternative distribution configurations. In these schematics, the reflector members are numbered RM1 to RM4; RM1 to RM3 are movable and correspond to the reflector member 111 shown in FIG. 2b, and RM4 is stationary, corresponding to reflector member 112. The input laser beam in path 105 is shown impinging on the reflector members RM1–RM4 as needed to generate the desired distribution output 107. In FIGS. 3a and 4a, all of the work pieces are treated simultaneously and the output distribution 107 is constant over the entire work period, time=1–n where n is the time needed to complete the desired work on a work piece. In FIGS. 5a, 6a, and 7a, different work pieces are treated at different times and there are separate depictions for each sub-period of time, time=t1, t2, . . . , n where t is the time needed to complete the desired work on one work piece and n is the total time needed for all work pieces. FIGS. 3b–7b are laser power output diagrams, shown over time, for the distribution configurations shown in FIGS. 3a–7a.

In FIG. 3a, an input laser beam 105 impinges on selected portions of the reflector members RM1–RM4, resulting in an equal distribution of laser power 107, thus splitting the beam into four equal outputs. In this configuration, RM1 is positioned at the 3/4 transmissive portion, thereby diverting 1/4 power and transmitting 3/4 power. RM2 is positioned at the ⅔ transmissive portion, thereby diverting ⅓ of the incoming ¾ power, which is equal to ¼ total power, and transmitting ⅔ of the ¾, which is equal to ½ total power. RM3 is positioned at the ½ transmissive portion, thereby diverting ½ of the incoming ½ total power, which is equal to ¼ total power, and diverting ¼ total power. RM4, being stationary, diverts the full incoming beam, thereby diverting ¼ total power. Therefore, the four equal power distribution outputs 107 are each equal to ¼ total input power. The power/time diagram for this configuration is shown in FIG. 3b. The four reflector members, RM1–RM4 thus distribute ¼ of the power of the laser output for the entire work time period, n.

FIG. 4a is a variation on the equal power distribution configuration of FIG. 3a. In this configuration, the power output 107 is still equal, but not all of the reflector members RM1–RM4 are used, thus splitting the beam into less than four equal outputs. Any combination of reflector members is possible, but in this embodiment, RM1 and RM3 are shown distributing the output equally, ½ to each. FIG. 4b shows the power/time diagram for this configuration. To achieve this distribution, RM1 is positioned at the ½ transmissive portion, RM2 is positioned at the fully transmissive portion, thereby transmitting the entire incoming beam from RM1 to RM3, and RM3 is positioned at the fully reflective portion. Although the configurations shown in FIGS. 3a and 4a equally distribute the beam output 107, the system is not limited to equal splitting of the beam. Any splitting combination generatable by the hardware is possible, as will be seen in subsequent configurations.

FIG. 5a shows a configuration where full power is sequentially distributed from each reflector member, RM1–RM4, for a sub-period of time, t, needed to complete an individual work piece, thus sequentially switching the full power output from reflector member to reflector member. For the first time sub-period, t1, RM1 is positioned at the fully reflective portion, thereby fully diverting the beam 107. During the next sub-period, t2, RM1 is fully transmissive and RM2 is fully reflective, thereby diverting the entire beam 107. During the next sub-period, t3, RM1 and RM2 are fully transmissive and RM3 fully diverts the beam 107. During the last time sub-period shown, t4, RM1, RM2 and RM3 are fully transmissive and RM4 fully diverts the beam 107. For a given cycle, all n of the work on a work piece may be completed, with duration at each stage. Alternatively, only part of the work is completed and the sequence is repeated to complete the work desired, with cumulative time=n. The power/time diagram for this configuration is shown in FIG. 5b. In this configuration, the time sub-period, t, is long enough to complete the work desired on a particular work piece, and the delay time between distributions, 3*t, provides time to remove the completed work piece and position the next work piece before the beam output is once again distributed to that reflector member.

The distribution configuration shown in FIG. 6a is a variation on the configuration shown in FIG. 5a. In this configuration full power is non-sequentially distributed from the reflector members for a sub-period of time needed to complete an individual work piece, thus non-sequentially switching full power output from reflector member to reflector member. The timing and order of the distribution is dependent on the work desired and is fully programmable by the user. For each time sub-period, t, the movable reflector members RM1–RM3 are positioned at either fully transmissive or fully reflective portions to give the desired beam distribution. FIG. 6b shows the power/time diagram for this configuration.

Through software manipulation, instead of hardware reconfiguration, the laser beam distribution apparatus 100 is programmable for any combination or permutation of beam distribution that the hardware is capable of producing. In such configurations, the beam is split between any number of reflector members, either with equal power or different power, at the same time as being switched from reflector member to reflector member in any order.

Figure 7B:
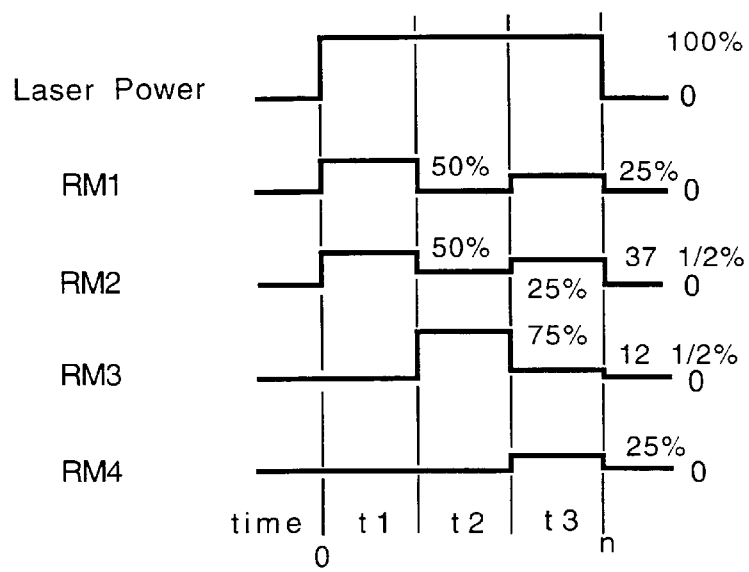

The distribution configuration of FIG. 7a shows such versatility. During the first time sub-period, t1, the input beam is distributed equally between RM1 and RM2, resulting in 50% power output 107 from each reflector member. To achieve this distribution, RM1 is positioned at the ½ transmissive portion and RM2 is positioned at the fully reflective portion. During the next time sub-period, t2, the beam is unequally split between RM2 and RM3, resulting in a 25% power output and a 75% power output, respectively. This distribution is achieved by positioning RM1 at the fully transmissive portion, RM2 at the ¾ transmissive portion and RM3 at the fully reflective portion. During the next time sub-period, t3, the input beam is both unequally and equally distributed between RM1, RM2, RM3 and RM4, resulting in 25% power output, 37½% power output, 12½% power output, and 25% power output, respectively. To achieve this distribution, RM1 is positioned at the ¾ transmissive portion, RM2 is positioned at the ½ transmissive portion, RM3 is positioned at the ⅔ transmissive portion, and RM4 is fully reflective. FIG. 7b shows the power/time diagram for this configuration.

This demonstrates the multitude of possibilities available for splitting and time switching the laser beam output. Providing more and/or different partially transmissive portions on the movable reflector members results in different output beam 107 possibilities, see FIG. 1a. All of these configurations are generated through software controlled movement of the movable reflector members, thereby eliminating the need for hardware reconfiguration or input beam manipulation.

Figure 8:
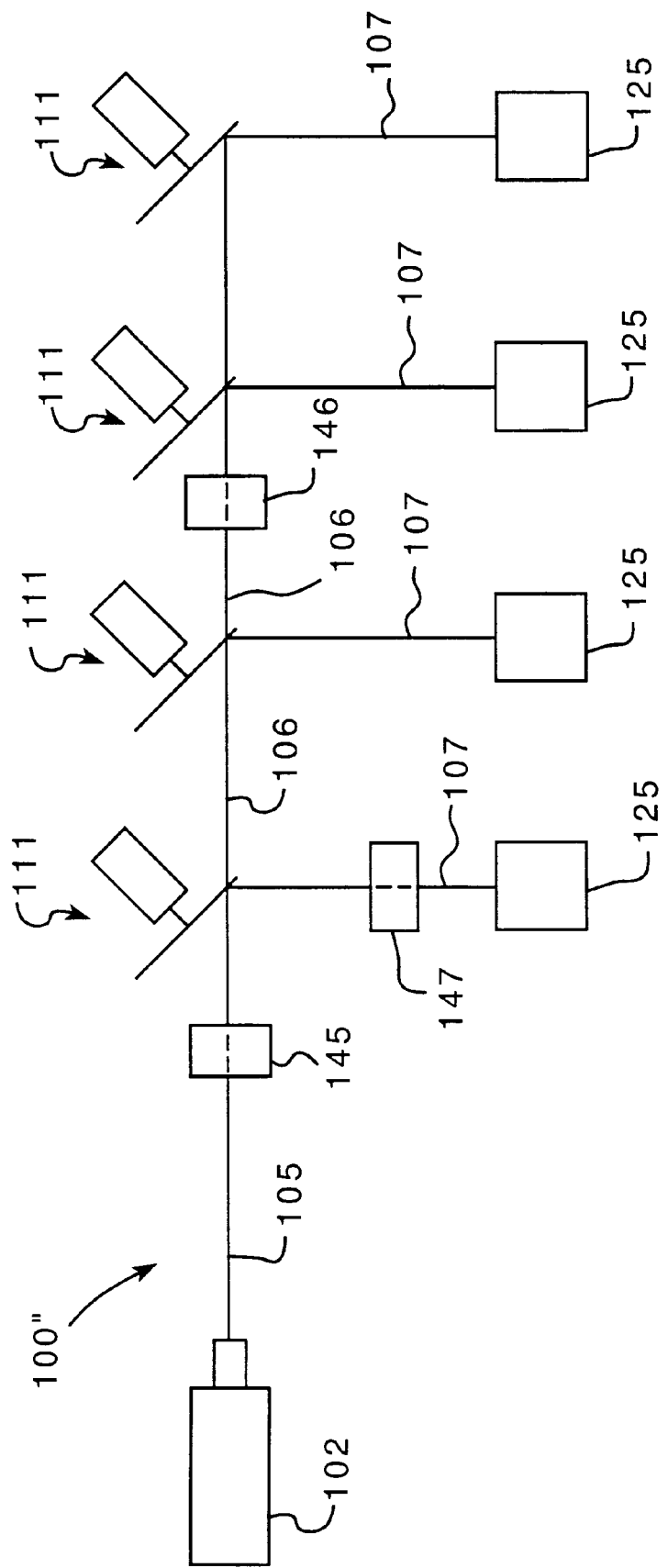
FIG. 8 is a diagram of a laser distribution apparatus having multiple reflector members and multiple attenuators.

Referring to FIG. 8, laser beam distribution apparatus 100", which is otherwise similar to the apparatus of FIG. 1, includes attenuators 145, 146, 147 at selected locations within the apparatus 100. The attenuators 145, 146, 147 absorb selectable proportions of the laser energy to decrease the power of the input beam in path 105, the beam in path 106 between reflector members 111, and the output beam 107. The attenuators 145, 146, 147, increase the versatility of the overall apparatus 100". Receptors 125 that require less laser power than would be possible with the given laser 102 of the apparatus 100" are accommodated by selected dissipation of laser energy upstream from the receptor 125. An attenuator 145 positioned in the input beam path 105 can selectively reduce the laser energy to the entire apparatus 100". Attenuator 146 positioned in the beam path 106 between reflector members can selectively reduce the laser energy to all subsequent reflector members. Attenuator 147 positioned in the output beam path 107 will only reduce the laser energy to the receptor 125 for that particular output beam 107.

Figure 9:
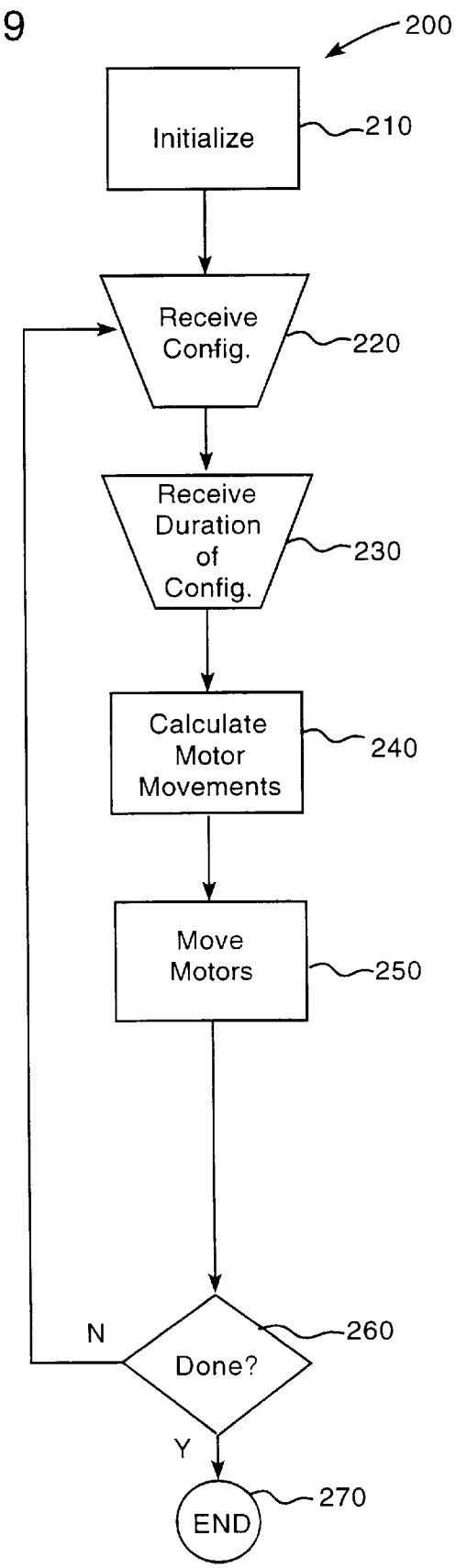
FIG. 9 is a flow chart of a software control scheme for controlling a laser beam distribution system according to the invention.

The versatility of the present invention is further enhanced by the combination of precisely controllable hardware and computer control software. The presently preferred basic control scheme was described above. A more detailed representation of the control program 200 is shown in FIG. 9. Control of the invention may be implemented in hardware or software, or a combination of both. However, preferably, the invention is implemented in computer programs executing on programmable computers each comprising a processor, a data storage system (including volatile and non-volatile memory and/or storage elements), at least one input device, and at least one output device. Program code is applied to input data to perform the functions described herein and to generate output information. The output information is applied to one or more output devices, in known fashion.

Each program is preferably implemented in a high level procedural or object oriented programming language. However, the programs can be implemented in assembly or machine language, if desired. In any case, the language may be a compiled or interpreted language.

Each such computer program is preferably stored on a storage media or device (e.g., ROM or magnetic diskette) readable by a general or special purpose programmable computer, for configuring and operating the computer when the storage media or device is read by the computer to perform the procedures described herein.

Referring to the flow chart of FIG. 9, the first task of a control program 200 is the computer initialization 210 of the laser distribution apparatus. This initialization 210 entails a determination of the number of reflector members attached to the system, which reflector members are movable, and how many, and what type of, receptors are attached to each reflector member. The initialization 210 also can include the homing of all reflector member motors and motor drivers to a known position.

The next task is the receipt of current laser distribution configuration information 220. This input configuration information includes process information related to the work to be performed on the work pieces, such as the laser power requirements at each receptor, the desired type of distribution between receptors, which receptors (related to which production lines) are to be used for the work, and the percentage of the input laser power required for each work piece. In some cases this information is manually input by the operator. In other cases the information is stored as a preprogrammed configuration which is accessible by the control program 200.

The next task is the receipt of time duration information 230 corresponding to the above current configuration. This duration input includes the time of the entire work to be performed, and the individual work piece time sub-periods for each receptor being used. This information can be stored in a look-up table or other format, it can be input by an operator, or in other cases, the software can calculate the information based on given parameters.

Once the information is input, the control program calculates a synchronized motor movement sequence 240. This motor movement sequence is based on the current configuration and duration inputs describe above. The motor movement calculation 240 results in a determination of the transmissivity level and time duration required at each reflector member to achieve the correct output laser power at each designated receptor. The calculation 240 includes a determination of which portion of each reflector member will provide the determined level of transmissivity for itself and all other reflector members. From this information, the synchronized motor movement sequence is determined, providing the correct input values for each motor driver to rotate the reflector members so that the correct portion of each reflector member is placed in the beam path.

Next, the control program 200 moves the motors 250 based on the calculated synchronized motor movement sequence described above. The motor drivers are provided with the calculated input values, and the motors are rotated to the correct position for the required time duration.

When the time for the current configuration has run, the control program 200 determines 260, whether other configurations are needed. If not, then the program ends 270. If so, then the program 200 repeats the sequential steps from the receipt of configuration input 220 until all configurations are complete. These subsequent configuration inputs can represent separate and discrete work to be performed on different or subsequent work pieces, or they can represent subsequent steps of work to be performed on the same work piece. Any combination or type of work is contemplated and performable with the above described control program 200.

This control scheme is programmable in many ways, no specific software code structure being required to produce the results of the present invention. The given control sequence may also be varied without affecting the scope of the present invention.

As can be seen from the above described embodiments and configurations, the laser beam distribution apparatus of the present invention provides a hardware and software system that is versatile, easily reconfigurable, and capable of both beam splitting and time switching without any physical hardware setup or reconfiguration. Within the broad aspects of the invention, the reflector members may be moved in linear or other motions, and various of the portions, shown mounted on the same reflector may be equivalently carried by separate members.

What is claimed is:

1. A laser beam distribution apparatus, comprising:

a laser beam input;

a series of beam reflector members disposed along a beam path, at least one of the members being movable and having at least one substantially fully transmissive portion, at least one substantially fully reflective portion, and at least one partially transmissive portion; and a selectively controllable drive device constructed to position a selected portion of the at least one movable reflector member in the laser beam path to distribute the beam to a selectable destination, the drive device being selectively controllable by operation of a programmed control system to direct the beam to only one destination for a designated discrete time period and being selectively controllable by operation of the programmed control system to produce a simultaneous distribution of a less than full power beam to multiple destinations.

2. The laser beam distribution apparatus of claim 1, wherein the selectively controllable drive device comprises one stepper motor connected to drive only a single movable reflector member.

3. The laser beam distribution apparatus of claim 2, wherein the position of the stepper motor is selectable by operation of computer software.

4. The laser beam distribution apparatus of claim 1, in which there are at least two reflector members in series, and all of the reflector members are movable.

5. The laser beam distribution apparatus of claim 1, in which there are at least two reflector members in series, and the last member comprises a fixed, fully reflective mirror.

6. The laser beam distribution apparatus of claim 5, wherein selectable destinations of the beam are the next reflector member in series, a receptor toward which the beam is fully diverted, and the combination of both the next reflector member and the receptor with the beam being partially transmitted through the reflector member and partially diverted toward the receptor.

7. The laser beam distribution apparatus of claim 6, wherein the selectively controllable drive device comprises a stepper motor connected to drive only a single movable reflector member.

8. The laser beam distribution apparatus of claim 7, wherein the position of the stepper motor is selectable by operation of computer software.

9. The laser beam distribution apparatus of claim 8, wherein the receptor comprises a fiber optic cable for transmitting the beam to a material treatment device.

10. The laser beam distribution apparatus of claim 8, wherein the receptor comprises an energy absorption device for absorbing power from the laser beam.

11. The laser beam distribution apparatus of claim 8, wherein the computer software is operable to produce a simultaneous distribution of a less than full power beam to multiple receptors.

12. The laser beam distribution apparatus of claim 11, wherein the at least one movable reflector member remains stationary while providing the desired beam distribution to the receptor, after moving the selected portion into position in the laser beam path.

13. The laser beam distribution apparatus of claim 8, wherein the computer software is operable to produce a distribution of the beam for discrete time periods to selected receptors.

14. The laser beam distribution apparatus of claim 13, wherein a full power beam is distributed to only one receptor for the designated discrete time period.

15. The laser beam distribution apparatus of claim 13, wherein a less than full power beam is distributed to multiple receptors for the designated discrete time period.

16. The laser beam distribution apparatus of claim 13, wherein the discrete time period is sufficient for the beam to perform its intended work.

17. The laser beam distribution apparatus of claim 8, wherein the at least one movable reflector member is mounted at an angle to the beam path.

18. The laser beam distribution apparatus of claim 17, wherein the stepper motor rotates the selected portion of the at least one movable reflector member into position within the beam path.

19. The laser beam distribution apparatus of claim 8, further comprising at least one attenuator in the beam path for dissipation of beam power.

20. The laser beam distribution apparatus of claim 19, wherein at least one attenuator is positioned in the input beam path prior to the reflector members.

21. The laser beam distribution apparatus of claim 19, wherein at least one attenuator is positioned in the output beam path after at least one reflector member.

22. The laser beam distribution apparatus of claim 19, wherein at least one attenuator is positioned in the beam path after at least one reflector member and prior to at least one reflector member.

23. The laser beam distribution apparatus of claim 8, wherein the fully transmissive portion of the reflector member is a through-hole.

24. The laser beam distribution apparatus of claim 8, wherein the fully transmissive portion of the reflector member is a notch.

25. The laser beam distribution apparatus of claim 8, further comprising a beam steering mechanism positioned in the input beam path prior to any reflector member.

26. The laser beam distribution apparatus of claim 25, wherein the beam steering mechanism comprises a first fully reflective mirror and a second fully reflective mirror, the first and second mirrors adjustably mounted at an angle to the beam path such that the first mirror is in the input beam path and diverts the beam path toward the second mirror, the second mirror is offset from the first mirror and diverts the beam path toward the series of reflector members.

27. A method of operating a laser beam distribution apparatus comprising a series of beam reflector members and a selectively controllable drive device, at least one of the beam reflector members being movable and having at least one substantially fully transmissive portion, at least one substantially fully reflective portion, and at least one partially transmissive portion, comprising the steps of:

producing a laser beam input along a beam path along which the beam reflector members are disposed;

selectively controlling the drive device to position a selected portion of the at least one movable reflector member in the laser beam path so as to direct the beam to only one destination for a designated discrete time period; and selectively controlling the drive device to position a selected portion of the at least one movable reflector member in the laser beam path so as to produce a simultaneous distribution of a less than full power beam to multiple destinations.

28. A computer program for controlling a laser distribution apparatus having a plurality of motors attached to configure the laser distribution and a plurality of movable beam reflector members driven by the motors and disposed along a beam path, the beam reflector members having at least one substantially fully transmissive portion, at least one substantially fully reflective portion, and at least one partially transmissive portion, comprising instructions for causing a computer to:

receive a current laser distribution configuration input including a duration input corresponding to the current configuration;

calculate a synchronized motor movement sequence for the plurality of motors attached to the laser distribution apparatus to achieve the current configuration and duration;

move the motors by providing an output to motor drivers attached to the motors, the output being based on the calculated synchronized motor movement sequence, the output causing the beam to be directed to only one destination for a designated discrete time period; and move the motors by providing an output to motor drivers attached to the motors, the output being based on the calculated synchronized motor movement sequence, the output producing a simultaneous distribution of a less than full power beam to multiple destinations.

* * * * *